T. R. CAMERON.
COTTON RETAINER OR DOG.
APPLICATION FILED JAN. 19, 1918.
1,280,391.
Patented Oct. 1, 1918.
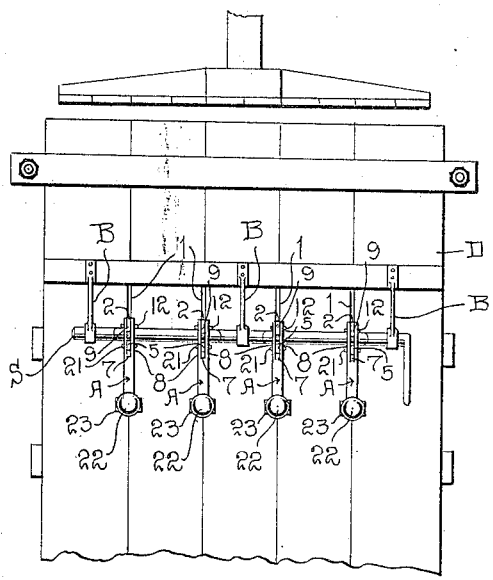
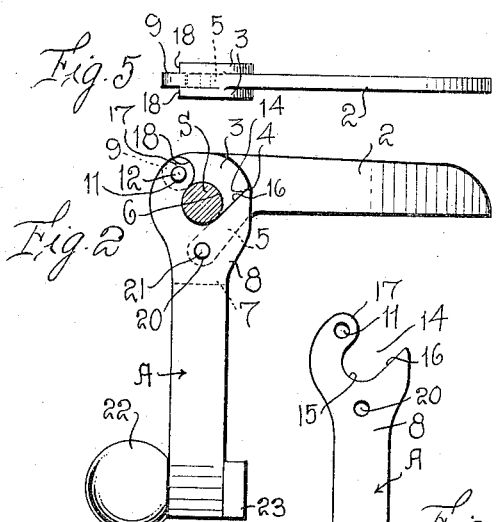
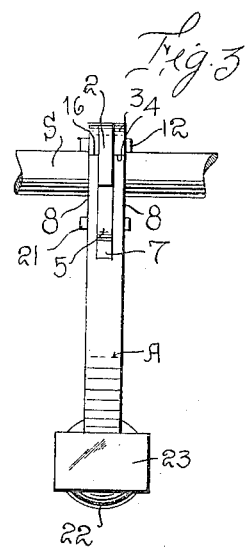
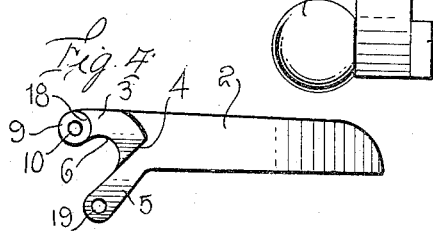
Inventor
THEODORE R. CAMERON
By Watson E. Coleman
Attorney

UNITED STATES PATENT OFFICE.

THEODORE R. CAMERON, OF SAN ANTONIO, TEXAS.

COTTON RETAINER OR DOG.

1,280,391.  Specification of Letters Patent.  Patented Oct. 1, 1918.

Application filed January 19, 1918. Serial No. 212,659.

*To all whom it may concern:*

Be it known that I, THEODORE R. CAMERON, a citizen of the United States, residing at San Antonio, in the county of Bexar and State of Texas, have invented certain new and useful Improvements in Cotton Retainers or Dogs, of which the following is a specification, reference being had to the accompanying drawings.

This invention relates to certain improvements in cotton retainers or dogs and has relation more particularly to a device of this general character which is employed in connection with a crank shaft carried by the door or wall of a cotton press and it is an object of the invention to provide a novel and improved retainer or dog of this general type whereby the same may be readily removed from and replaced upon a crank shaft without the necessity of removing said shaft or any of the remaining retainers or dogs which may be mounted upon the shaft.

It is also an object of the invention to provide a novel and improved cotton retainer or dog which comprises separable parts and which are maintained in assembled relation at one or more points by a member which will shear or break under excessive pressure, thereby preventing breaking of the dog proper of the press in the event that they were not turned out of the press box prior to the pressing of the cotton into a bale.

The invention consists in the details of construction and in the combination and arrangement of the several parts of my improved cotton retainer or dog whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in elevation illustrating a cotton retainer constructed in accordance with an embodiment of my invention and in applied position;

Fig. 2 is an enlarged elevational view of one of the improved retainers as herein disclosed, the coacting crank shaft being indicated in section;

Fig. 3 is a view in elevation of the inner face of my improved retainer as herein disclosed with the coacting crank shaft being indicated in fragment;

Fig. 4 is a view in side elevation of the dog as embodied in my improved retainer;

Fig. 5 is a view in top plan of the dog as disclosed in Fig. 4; and

Fig. 6 is an elevational view of the arm embodied in my improved retainer.

As disclosed in the accompanying drawings D denotes a door or wall of a press provided with a transversely disposed series of openings 1 through which the dogs 2 of the cotton retainers pass to coact in a well known manner with the cotton within the press to be baled.

S denotes a crank shaft rotatably supported by the brackets B carried by the door or wall D. The shaft S is positioned exteriorly of the press and is disposed transversely of the door or wall D as is clearly illustrated in Fig. 1.

The rear end of each of the dogs 2 at its upper longitudinal marginal portion is provided with the longitudinally disposed extension or heel 3 and said heel or extension 3 is of a thickness greater than the dog 2 to afford the inclined or beveled shoulders 4 at opposite sides of the dog 2 adjacent the inner end thereof. The rear portion of the dog 2 adjacent its lower longitudinal margin is provided with the extension or arm 5 disposed on an angle of substantially 45° to the longitudinal axis of the dog 2. The lower face or edge 6 of the heel or extension 3 is substantially semi-circular in form and on the same radius as the shaft S.

A denotes an arm having its upper portion bifurcated as at 7 to afford parallel spaced arms 8. Extending between the arms 8 is the arm or extension 5 and the free end portion of the heel or extension 3. The portion 9 of the extension or heel 3 extending between the arms 8 is reduced and provided with an opening 10 adapted to register with an opening 11 in the rear portion of each of the arms 8 and through said registering openings 10 and 11 is directed a pin 12 preferably of wood.

Inwardly of the opening 11 the upper end portion of each of the arms 8 is provided with the open slot 14 having its inner or base portion 15 substantially semi-circular in form and on the same radius as the shaft S so as to snugly receive said shaft S when the retainer is applied thereon. The inner wall of the open slot 14 is straight and provided on an angle of substantially 45° relative to the horizontal so that one of the shoulders 4 of the dog 2 hereinbefore referred to, will contact with said straight portion 16, so that normally the pin 12 is relieved of any material strain. The upper portion of the arm 8 of the outer side of the slot 14 is rounded as indicated at 17 and with which contacts a rounded shoulder 18 extending laterally of and defining an inner portion of the reduced part 9 of the heel or extension 3.

The outer or free end of the arm 5 is provided with an opening 19 adapted to register with an opening 20 produced in each of the arms 8 and also disposed through the registering openings 19 and 20 is a pin 21 preferably of wood. By this arrangement it will be perceived that the dog 2 and arm A may be effectively maintained in assembled relation and the device in its entirety properly mounted upon the crank shaft S.

Extending outwardly from the lower end portion of the arm A is the weighted member 22 which serves as an automatic means for imparting upward swinging movement to the dog 2. The inner face of the arm A has secured to the lower portion thereof the cross member or transverse plate 23 which contacts with the door or wall D to limit the upward swinging movement of the dog 2.

Should a dog 2 not be withdrawn from within the press the pressure imposed thereupon during the baling operation will result in the shearing or breaking of a pin 12 or 21 or both of such pins. As the dog 2 and arm 1 are readily separable, it will be at once self-evident that the same can be properly assembled by the insertion of new pins. It will also be understood that should the dog 2 fracture the same can be readily replaced.

If it is preferred by the operator that the pins 12 or 21 be of metal the arm 5 which is the weakest part of the device in its entirety, will break or fracture should the dog not be withdrawn during the baling operation and the dog so acted upon can be replaced with convenience and facility. The breaking of the arm 5 is further assured by making the dog 2 and its parts of cast iron.

I claim:

1. A cotton retainer comprising two separable parts, and breakable means for maintaining said separable parts in assembled relation.

2. A cotton retainer comprising two separable parts, and breakable means for maintaining said separable parts in assembled relation, the adjacent portions of said separable parts being provided with registering recesses to afford a mounting for the retainer.

3. A cotton retainer comprising two separable parts, and breakable means for maintaining said separable parts in assembled relation, one of said parts comprising a dog movable within the baling chamber of a press and the second of said parts being provided with a weighted arm.

4. A cotton retainer comprising two members having adjacent end portions interlocking, said interlocking end portions being provided with registering recesses to afford a mounting for the retainer, and means arranged above and below said registering recesses for normally holding said members in assembled relation.

5. A cotton retainer comprising a dog provided with a longitudinally disposed heel at the upper longitudinal marginal portion thereof, and a rearwardly inclined arm extending from the lower longitudinal marginal portion thereof, a weighted arm having its upper end portion bifurcated to receive the heel and arm of the dog, removable members for connecting said last named arm with the heel and arm of the dog, the adjacent end portions of the second named arm and the dog being provided with registering recesses to afford a mounting for the retainer.

6. A cotton retainer comprising a dog provided with a longitudinally disposed heel at the upper longitudinal marginal portion thereof, and a rearwardly inclined arm extending from the lower longitudinal marginal portion thereof, a weighted arm having its upper end portion bifurcated to receive the heel and arm of the dog, removable members for connecting said last named arm with the heel and arm of the dog, the adjacent end portions of the second named arm and the dog being provided with registering recesses to afford a mounting for the retainer, the heel of the dog being of a thickness greater than the dog to afford shoulders at opposite sides of the dog, the shoulders of the dog contacting with the second named arm when the arm and dog are assembled.

In testimony whereof I hereunto affix my signature in the presence of two witnesses.

THEODORE R. CAMERON.

Witnesses:
J. J. HAGMAN,
IDA MILLER.